(12) United States Patent
Dubost

(10) Patent No.: US 8,152,405 B2
(45) Date of Patent: Apr. 10, 2012

(54) SYSTEM FOR FIXING TWO COMPONENTS TO EACH OTHER

(75) Inventor: Dominique Dubost, La Celle St Cloud (FR)

(73) Assignee: Attax, Carrieres sur Seine (FR)

( * ) Notice: Subject to any disclaimer, the term of this patent is extended or adjusted under 35 U.S.C. 154(b) by 67 days.

(21) Appl. No.: 12/108,542

(22) Filed: Apr. 24, 2008

(65) Prior Publication Data
US 2008/0271297 A1 Nov. 6, 2008

(30) Foreign Application Priority Data

Apr. 26, 2007 (FR) ...................................... 07 54713

(51) Int. Cl.
*F16B 5/02* (2006.01)
(52) U.S. Cl. ........ 403/388; 403/397; 24/293; 24/585.12
(58) Field of Classification Search .................. 403/388, 403/397; 24/292–295, 585.12
See application file for complete search history.

(56) References Cited

U.S. PATENT DOCUMENTS

| | | | | |
|---|---|---|---|---|
| 3,673,643 | A * | 7/1972 | Kindell | 24/458 |
| 4,630,338 | A * | 12/1986 | Osterland et al. | 24/293 |
| 5,833,480 | A * | 11/1998 | Austin | 439/95 |
| 6,101,686 | A * | 8/2000 | Velthoven et al. | 24/295 |
| 6,141,837 | A * | 11/2000 | Wisniewski | 24/295 |
| 6,145,933 | A * | 11/2000 | Watson et al. | 299/13 |
| 6,438,804 | B1 * | 8/2002 | Romero Magarino | 24/289 |
| 6,665,914 | B2 * | 12/2003 | Ogawa | 24/297 |
| 6,671,934 | B2 * | 1/2004 | Wenzlick et al. | 24/295 |
| 7,051,408 | B2 * | 5/2006 | De Azevedo et al. | 24/295 |
| 7,096,638 | B2 * | 8/2006 | Osterland et al. | 52/708 |
| 7,213,304 | B2 * | 5/2007 | Lubera et al. | 24/295 |
| 7,415,752 | B2 * | 8/2008 | De Azevedo et al. | 24/295 |
| 2004/0016087 | A1 | 1/2004 | Osterland et al. | |

FOREIGN PATENT DOCUMENTS

EP 1760328 3/2007

* cited by examiner

*Primary Examiner* — Michael P Ferguson
*Assistant Examiner* — Nahid Amiri
(74) *Attorney, Agent, or Firm* — Sughrue Mion, PLLC

(57) ABSTRACT

This system, comprising a fastener (1) which is V-shaped and which comprises an intermediate portion (2) which is in the form of a clamp having two arms (3, 4), for receiving a projecting portion (12a, 12b) of the first component (12) and from which wings (6, 7) extend and are provided with engagement means for passing an over-center position on an edge of the second component (13) and in the region of the junction zone of each wing and the corresponding arm, at least one harpoon-like cut-out (8, 9) extending in continuation of the wing in the direction of the intermediate portion, is characterized in that the engagement means of the wings (6, 7) comprise means for resilient snap-fitting thereof on the edge of the second component (13), allowing the projecting portion (12a, 12b) of the first component (12) to be engaged, to a greater or lesser depth, in the intermediate clamp-like portion (2) of the fastener (1) during assembly thereof, in order to adjust the two components relative to each other.

7 Claims, 4 Drawing Sheets

SYSTEM FOR FIXING TWO COMPONENTS TO EACH OTHER

Figure 1:
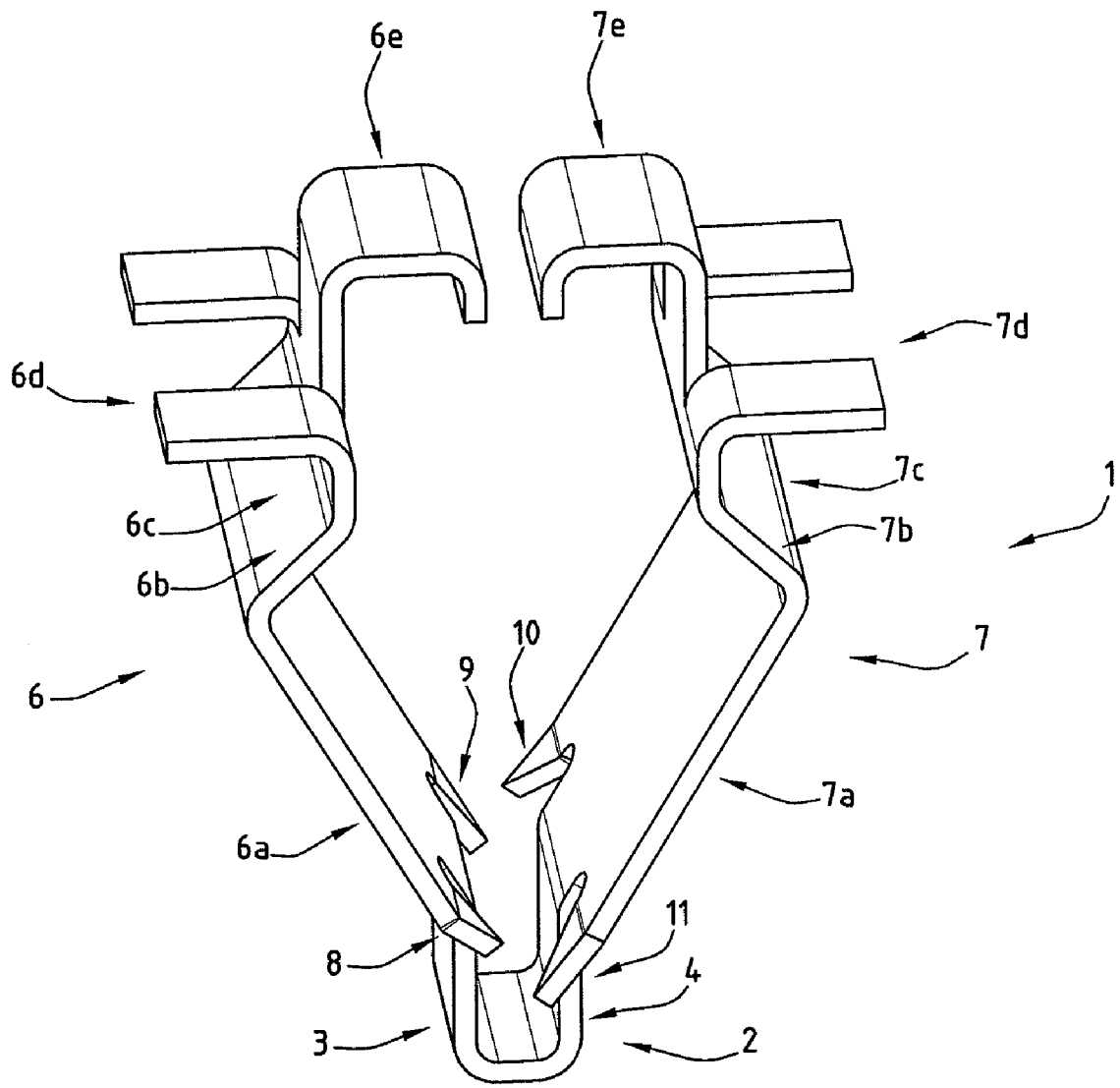

The present invention relates to a system for fixing two components to each other.

More specifically, the invention relates to such a fixing system comprising a resilient fastener which is generally V-shaped and which comprises an intermediate portion which is in the form of a clamp which has two arms and which is suitable for receiving at least a projecting portion of the first component and from the arms of which lateral wings extend and are provided with engagement means for passing an over-centre position on a corresponding edge of the second component in order to engage the components with each other and in the region of the junction zone of each lateral wing and the corresponding arm of the intermediate portion, at least one harpoon-like cut-out extending in continuation of the corresponding wing in the direction of the intermediate portion, in order to allow the intermediate portion of the fastener to be fixed in position on the first component.

Such resilient fasteners are used in a number of applications, in particular in the automotive industry, in order to bring about the fixing of two components of equipment of a vehicle to each other.

In the prior art, when components are assembled together, the fastener is firstly engaged with the projecting portion of the first component so as to bring about the engagement of the fastener with that projecting portion.

Subsequently, that first component and that fastener are engaged, for example, in an opening of the second component so as to bring about the engagement of the fastener and therefore of the first component with the second component.

However, it will be appreciated that such a structure has a given number of disadvantages in particular in terms of the successive assembly and disassembly operations and adjusting the components relative to each other.

Different assembly clearances may become evident in that the components are not precisely adjusted with respect to each other.

Therefore, the object of the invention is to overcome those problems.

To that end, the invention relates to a system for fixing two components to each other, comprising a resilient fastener which is generally V-shaped and which comprises an intermediate portion which is in the form of a clamp which has two arms and which is suitable for receiving at least a projecting portion of the first component and from the arms of which lateral wings extend and are provided with engagement means for passing an over-centre position on a corresponding edge of the second component in order to engage the components with each other and in the region of the junction zone of each lateral wing and the corresponding arm of the intermediate portion, at least one harpoon-like cut-out extending in continuation of the corresponding wing in the direction of the intermediate portion, in order to allow the intermediate portion of the fastener to be fixed in position on the first component, characterised in that the engagement means of the lateral wings of the fastener comprise means for assembly by resilient snap-fitting thereof on the corresponding edge of the second component, allowing the projecting portion of the first component to be engaged, to a greater or lesser depth, in the intermediate clamp-like portion of the fastener during assembly thereof, in order to adjust the assembly of the two components relative to each other.

According to specific embodiments, the system comprises one or more of the following features taken in isolation or in accordance with any technically possible combination:

the harpoon-like cut-outs are constructed by cut-outs which are inclined so as to extend from the lateral wings of the fastener, it comprises symmetrical lateral wings extending from the arms of the intermediate portion, each lateral wing has, extending from the intermediate portion of the fastener, a portion which is inclined towards the outer side of the fastener, a portion which is inclined towards the inner side of the fastener, a portion for receiving the corresponding edge of the second component and an abutment portion, the ends of the lateral wings of the fastener comprise abutment surfaces which are suitable for moving into abutment against each other in an assembly position of the fastener on the second component, the first component comprises two projecting portions which are spaced apart from and parallel with each other and which are suitable for becoming engaged at one side and the other of the abutment surfaces of the ends of the lateral wings of the fastener and between the harpoon-like cut-outs of the intermediate portion of that fastener, the fastener is constructed by cutting and shaping a sheet metal blank.

Figure 2:
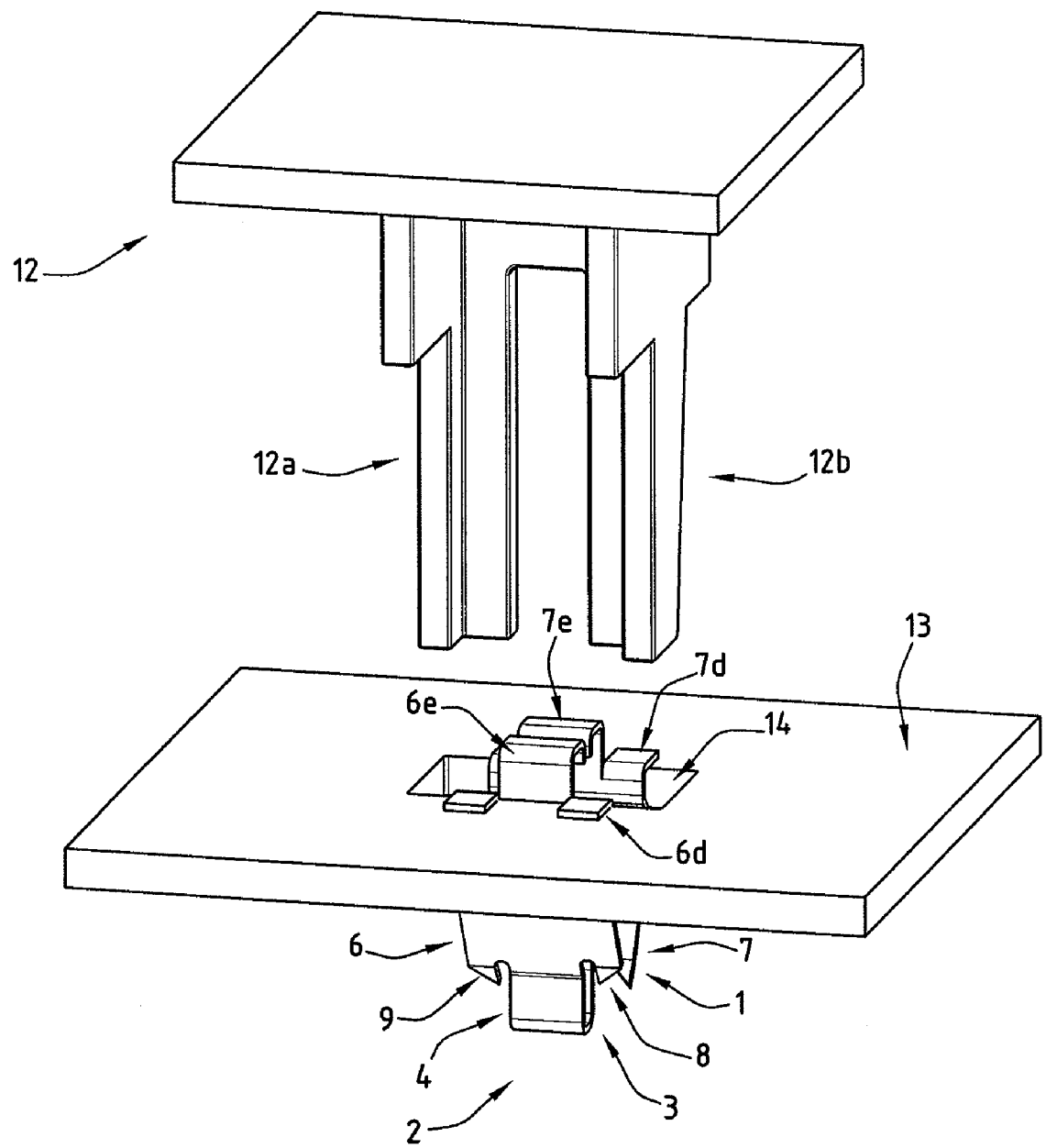
Figure 3:
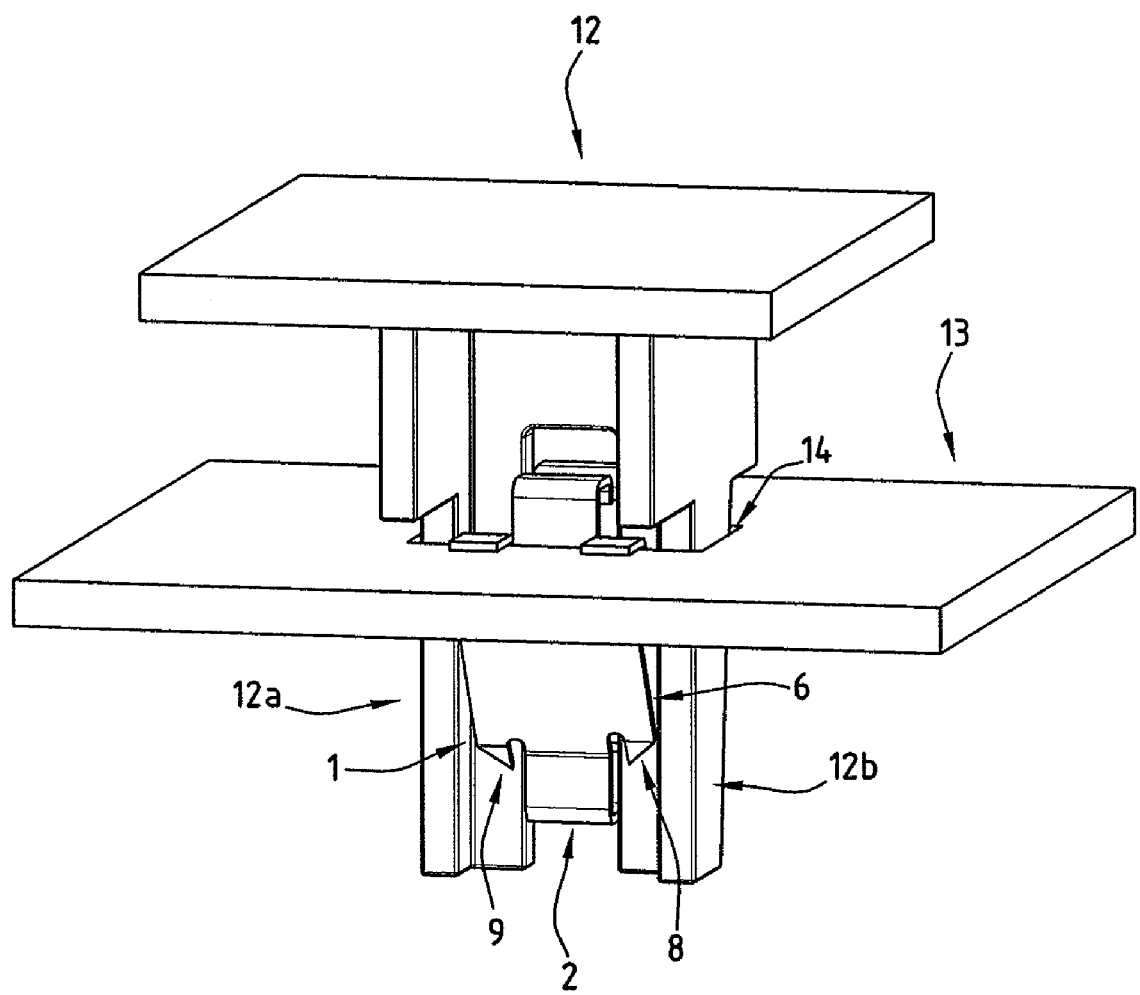
Figure 4:
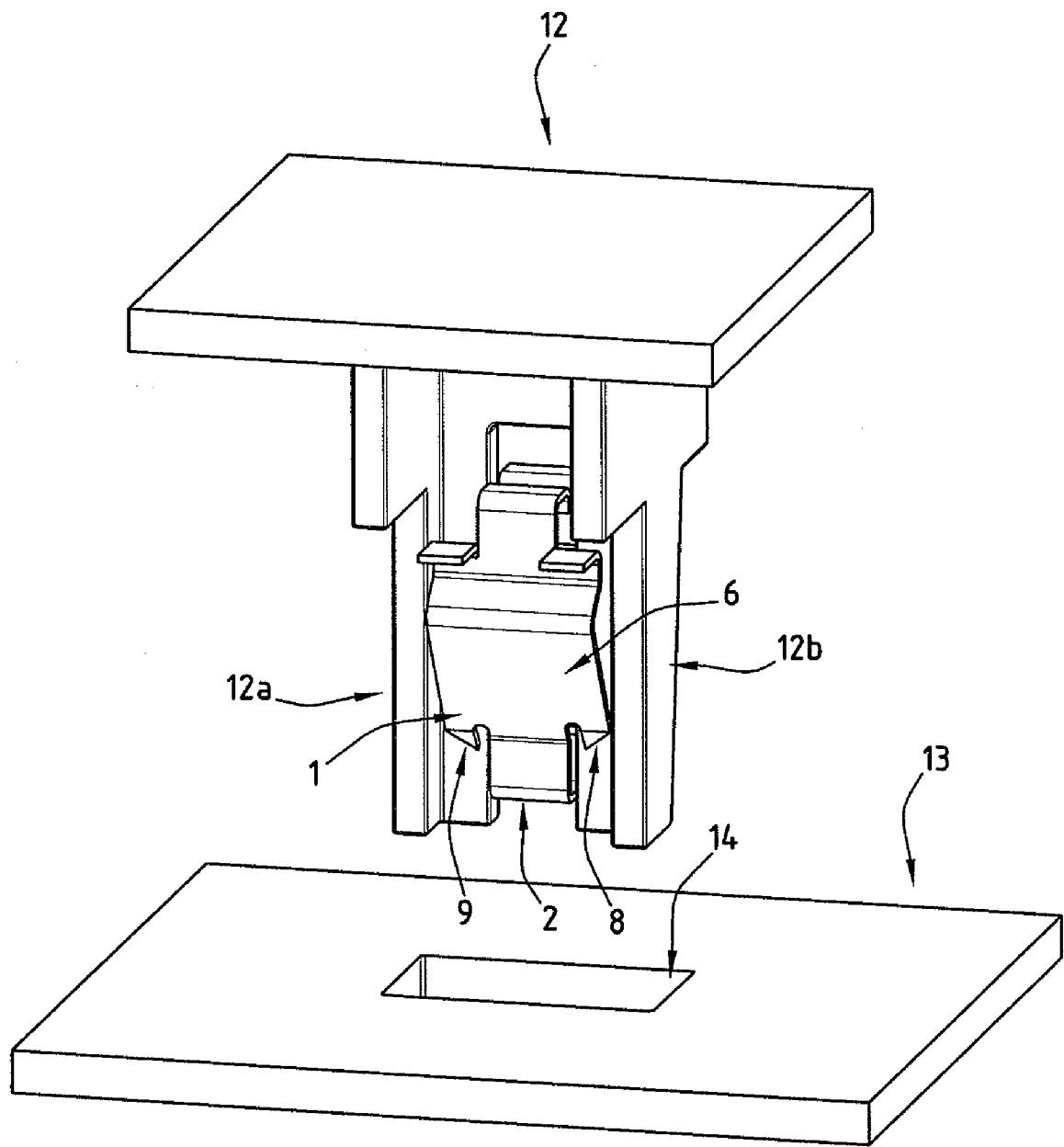

The invention will be better understood from the following description which is given purely by way of example and with reference to the appended drawings in which:

FIG. 1 is a perspective view of a fastener being involved in the construction of a system according to the invention; and FIGS. 2, 3 and 4 are perspective views illustrating the assembly and disassembly of such a system.

Those Figures illustrate a system for fixing two components to each other which comprises a resilient fastener which is generally designated 1 in FIG. 1 and which is generally V-shaped, comprising an intermediate portion in the form of a clamp having two arms, that intermediate portion being generally designated 2 in that Figure.

The two arms are themselves generally designated 3 and 4.

That intermediate portion is suitable, as will be described in greater detail below, for receiving and/or co-operating with at least a projecting portion of a first component. Furthermore, those arms 3, 4 of the intermediate portion 2 of the fastener are extended by symmetrical lateral wings 6 and 7.

Those lateral wings 6 and 7 are provided with engagement means for passing an over-centre position on a corresponding edge of a second component in order to engage the components with each other. Those means will be described in greater detail below.

This fastener also comprises, in the region of the junction zone of each lateral wing 6, 7 and each corresponding arm 3, 4 of the intermediate portion 2, at least one harpoon-like cut-out which extends in continuation of the corresponding wing in the direction of the intermediate portion of the fastener in order, as will be described in greater detail below, to fix in position the projecting portion of the first component in that intermediate portion of the fastener in the form of a two-armed clamp.

In the embodiment illustrated, those harpoon-like cut-outs are constructed by cut-outs of the lateral wings of the fastener.

In the example illustrated, four harpoon-like cut-outs are provided and are generally designated 8, 9, 10 and 11. Those cut-outs are constructed at each side of the intermediate portion so as to extend from each lateral wing.

As illustrated, each lateral wing 6 or 7 further has, extending from the intermediate portion of the fastener, a portion which is inclined towards the outer side of the fastener and which is generally designated 6a, 7a, a portion 6b, 7b which is inclined towards the inner side of the fastener, a portion 6c, 7c for receiving the corresponding edge of the second component and, finally, an abutment portion 6d, 7d. Those abutment portions are formed, for example, by two tongues which are bent through 90° towards the outer side of the fastener.

Those different portions define the resilient snap-fit assembly means of the securing member with respect to the corresponding edge of the second component, thereby allowing the securing member to be fixed in position on the corresponding edge of the second component and, to a greater or lesser depth, the projecting portion of the first component to be engaged in the intermediate portion of the securing member during the assembly thereof in order to adjust the assembly of the two components relative to each other.

As is also visible in FIG. 1, the ends of the lateral wings 6, 7 of the fastener also comprise symmetrical abutment surfaces 6e, 7e, which are suitable for moving into abutment against each other in the assembly position of the fastener on the second component. Those abutment surfaces are also formed, for example, by tongues which are bent towards the inner side of the fastener.

FIGS. 2 to 4 illustrate the assembly and disassembly of a fixing system according to the invention.

These Figures illustrate the fastener which is described above and generally designated 1, a first component which is generally designated 12 and which comprises two projecting portions 12a, 12b and a second component which is generally designated 13 and which comprises, for example, an opening which is generally designated 14 and in which the resilient fastener 1 is engaged, that resilient fastener being engaged by means of resilient snap-fitting of the lateral wings thereof on corresponding facing edges of that opening.

The first assembly phase of such a system involves engaging the fastener in position and fixing it in position on the edges of the opening.

This is brought about by way of means for passing an over-centre position of the lateral wings of the fastener, the corresponding edges of the opening being received in the corresponding receiving portions 6c, 7c of those wings in order to bring about the fixing of the fastener in position.

As is also illustrated in those Figures, the two projecting portions 12a, 12b of the first component 12 are spaced apart from and parallel with each other. They are suitable for becoming engaged at one side and the other of the abutment surfaces 6e, 7e of the ends of the lateral wings 6, 7 of the fastener and for being inserted, as is illustrated particularly in FIG. 3, between the harpoon-like cut-outs of the intermediate portion of the fastener in the form of a two-armed clamp, in order to fix in position those projecting portions and therefore the second component relative to the first component.

Such a structure allows good adjustment to be brought about between the two components with respect to each other in that the projecting portions 12a, 12b of the first component 12 can be engaged, to a greater or lesser depth, in the intermediate clamp-like portion of the fastener during assembly thereof, which allows any assembly clearances to be taken up.

Furthermore, in the event of any disassembly of the two components with respect to each other, the fastener 1 remains fixed in position on the projecting portions 12a, 12b of the first component 12 and then becomes disengaged from the opening 14 of the second component. During the re-assembly of the two components with respect to each other, they will again take up their initial adjustment position.

Naturally, different embodiments of this fastener may be envisaged. It will also be appreciated that it can be constructed by cutting and shaping a sheet metal blank.

The invention claimed is:

1. An assembly comprising:
   a first component having at least a projecting portion,
   a second component having an opening comprising an edge, and
   a system for fixing said first component and said second component to each other,
   wherein the system comprises a resilient fastener which is generally V-shaped, and which comprises:
   an intermediate portion which is in the form of a clamp which has two arms and which receives the projecting portion of the first component,
   lateral wings extending from the arms and having, extending from the intermediate portion of the fastener, a portion which is inclined towards the outer side of the fastener, a portion which is inclined towards the inner side of the fastener, a portion receiving the edge of the second component and an abutment portion,
   each lateral wing having an end that is cut into a first tongue and a second tongue, wherein the first tongue is bent through 90° towards the outer side of the fastener and forms the abutment portion, and the second tongue is bent towards the inner side of the fastener and forms an abutment surface, so that the second tongues abut against each other when the fastener is assembled on the second component, and
   each lateral wing joins a corresponding arm of the intermediate portion in a junction zone, said junction zone comprising at least one cut-out extending in continuation of the corresponding wing in the direction of the intermediate portion, said cut-out cooperating with the projecting portion of the first component so as to fix said projecting portion in position relative to the intermediate portion of the fastener.

2. The assembly according to claim 1, wherein the cut-outs are inclined so as to extend from the lateral wings of the fastener.

3. The assembly according to claim 2, wherein the system comprises symmetrical lateral wings extending from the arms of the intermediate portion.

4. The assembly according to claim 1, wherein the system comprises symmetrical lateral wings extending from the arms of the intermediate portion.

5. An assembly according to claim 1,
   wherein the first component comprises two projecting portions which are spaced apart from and parallel with each other and which are engaged at one side and the other of the abutment surfaces of the ends of the lateral wings of the fastener and between the cut-outs of the intermediate portion of that fastener.

6. The assembly according to claim 1, wherein the fastener is constructed by cutting and shaping a sheet metal blank.

7. The assembly according to claim 5, wherein said abutment surfaces abut each other within a space between said two projecting portions.

* * * * *